United States Patent [19]

Gebauer

[11] Patent Number: 4,546,141

[45] Date of Patent: Oct. 8, 1985

[54] PRIMER COATING COMPOSITION FOR TOPCOATS OF FLUOROCARBON POLYMERS CONTAINING A POLYARYLENE SULFIDE RESIN, AN AROMATIC POLYETHER-SULFONE RESIN OR AN AROMATIC POLYETHER-KETONE RESIN

[75] Inventor: Gerhard Gebauer, Burgkirchen, Fed. Rep. of Germany

[73] Assignee: Hoechst Aktiengesellschaft, Fed. Rep. of Germany

[21] Appl. No.: 515,289

[22] Filed: Jul. 19, 1983

[30] Foreign Application Priority Data

Jul. 20, 1982 [DE] Fed. Rep. of Germany ....... 3227043
Jul. 20, 1982 [DE] Fed. Rep. of Germany ....... 3227044
Jul. 20, 1982 [DE] Fed. Rep. of Germany ....... 3227045

[51] Int. Cl.$^4$ .................... C08K 3/22; C08L 29/10
[52] U.S. Cl. .................... 524/401; 524/462; 524/502; 524/508; 427/409; 428/422
[58] Field of Search ............... 524/401, 462, 502, 508

[56] References Cited

U.S. PATENT DOCUMENTS

| | | | |
|---|---|---|---|
| T952,005 | 11/1976 | Attwood | 524/502 |
| T988,008 | 11/1979 | Mayer et al. | 525/537 |
| 3,856,735 | 12/1974 | Blackwell | 524/502 |
| 3,856,736 | 12/1974 | Tieszen | 524/502 |
| 3,963,605 | 6/1976 | Seabourn | 524/502 |
| 4,090,993 | 5/1978 | Attwood | 524/508 |
| 4,139,576 | 2/1979 | Yoshimura et al. | 260/857 PA |
| 4,287,112 | 9/1981 | Berghmans | 524/502 |
| 4,321,174 | 3/1982 | Hoy | 524/508 |
| 4,343,841 | 8/1982 | Close | 524/508 |
| 4,395,445 | 7/1983 | Gebauer | 524/401 |
| 4,443,574 | 4/1984 | Coq | 524/502 |

FOREIGN PATENT DOCUMENTS

| | | | |
|---|---|---|---|
| 0077432 | 6/1975 | Japan | 524/502 |
| 6090862 | 7/1981 | Japan | 524/502 |
| 0105442 | 6/1982 | Japan | 524/508 |

OTHER PUBLICATIONS

Informal, Partial Translation of Japanese Kokai 50-77432, (Daikin), Bottom 4 Lines of Col. 2 of p. 184, and Top 13 Lines of col. 1 of p. 185.
Informal, Partial Translation of Japanese Kokai 56-90862, (Daikin), Lines 14 to 20, of col. 1, and Lines 1 to 10 of col. 2 of p. 430.

*Primary Examiner*—C. Warren Ivy
*Attorney, Agent, or Firm*—Connolly and Hutz

[57] ABSTRACT

A primer coating composition which is particularly suitable for topcoating with fluorocarbon polymers is described, this primer composition contains
(a) 100 parts by weight of a copolymer of tetrafluoroethylene, perfluoro(alkylvinyl) ethers and if appropriate hexafluoropropylene or vinylidene fluoride,
(b) 10 to 250 parts by weight of a mixture of lithium hydroxide and finely divided silicon dioxide produced by thermal treatment,
(c) 10 to 1000 parts by weight of at least one thermoplastic resin from the group comprising the polyarylene sulfide resins, the aromatic polyether-sulfone resins and the aromatic polyether-ketone resins and
(d) water as a liquid carrier.

Up to 80 parts by weight of component (a) can, if appropriate, be replaced by dispersed polytetrafluoroethylene particles. The primer composition is especially suitable for application on articles with uneven surfaces, since it is sufficiently adhesion-promoting even in relatively thick layers. It is used for coating both metallic and non-metallic substrates, and a topcoat of a fluorocarbon polymer is subsequently applied, without intermediate heat treatment being necessary.

12 Claims, No Drawings

PRIMER COATING COMPOSITION FOR TOPCOATS OF FLUOROCARBON POLYMERS CONTAINING A POLYARYLENE SULFIDE RESIN, AN AROMATIC POLYETHER-SULFONE RESIN OR AN AROMATIC POLYETHER-KETONE RESIN

Coatings of fluorocarbon polymers are frequently built up by first applying a primer coat on to the substrate to be coated, the essential function of this coat being to promote adhesion between the fluorocarbon polymer, which in itself adheres poorly, and the substrate. The primer which constitutes this primer coat can also contain, in the form of a colloidal dispersion, proportions of the polymer subsequently applied as a topcoat (fluorocarbon polymer primer dispersion). One or more topcoats of fluorocarbon polymers, usually in the form of colloidal dispersions, are then applied on top of the primer coat, and it is desirable to manage as far as possible with only one coat of sufficient thickness so that the coating process can be carried out economically.

Such a primer is required in particular to exhibit a firm adhesion both to the substrate to be coated and to the topcoat to be applied, and to be capable of being applied simply and without defects.

The primers which were frequently used previously and contained chromates as adhesion-promoting components are now used only in exceptional cases owing to the toxicity of the compounds of hexavalent chromium. Suitable primers for topcoats of fluorocarbon polymers are, as described in German Offenlegungsschrift No. 1,959,144 mixtures of colloidal dispersions of fluorocarbon polymers with lithium polysilicate, or, as disclosed in German Offenlegungsschrift No. 2,110,768, mixtures of colloidal aqueous dispersions of fluorocarbon polymers with lithium hydroxide and, suspended therein in finely divided form, silicon dioxide produced by thermal treatment. Before firmly adhering topcoats of fluorocarbon polymers are applied, these primers, after having been applied onto the substrate, have to be dried at temperatures of 80° to 100° C. and then heated to temperatures of 230° to 400° C., after which they have to be once again cooled to room temperature. Only after this heat treatment, which requires a large amount of energy and blocks a large part of the oven capacity of a coating plant, is it possible to apply a further coating of fluorocarbon polymers and to achieve adequate adhesion between primer coat and topcoat.

European Offenlegungsschrift No. 14,974 describes a primer which consists on the one hand of copolymers of tetrafluoroethylene with perfluoro(alkylvinyl)ethers (these copolymers also containing, if appropriate, hexafluoropropylene or vinylidene fluoride), and on the other hand of a mixture of aqueous lithium hydroxide solution with, suspended therein in finely divided form, silicon dioxide produced by thermal treatment. Topcoats of fluorocarbon polymer dispersions can be applied onto such primers without it being necessary to employ an expensive drying and heating procedure after the application of the primer.

Topcoats of fluorocarbon polymers exhibit excellent adhesion on a primer coat produced with the above-mentioned mixture according to European Offenlegungsschrift No. 14,974 if this primer coat does not exceed a certain critical thickness, which is approximately in the region of 10 $\mu$m. If the thickness of the primer coat is substantially greater than 10 $\mu$m, it is not possible to achieve a sufficiently firm bond between the primer coat and a topcoat applied thereon. For reasons of cost-efficiency, every attempt will of course be made to keep the thickness of the primer coat as small as possible; however, in many cases it is impossible, when applying the primer coat, to avoid exceeding those layer thicknesses at which a firm bond between primer coat and topcoat is still reliably ensured. This occurs, for example, when coating the insides of pots which have small diameters and high walls by means of sprayguns. To ensure that the entire inner surface is covered by the primer dispersion, the amount of material which has to be sprayed on is such that the critical layer thickness is exceeded at some points on the substrate, and adequate adhesion therefore cannot be achieved at these points. Another example of the occurrence of relatively thick layers of the primer coat arises in connection with substrates with a hammered ground, where, in the bowl-shaped depressions, it is likewise virtually impossible to maintain such a maximum layer thickness.

It is therefore an object of the invention to develop a primer for subsequent application of topcoat dispersions of fluorocarbon polymers, which primer possesses good adhesion properties even in layer thicknesses of more than 10 $\mu$m and on which a topcoat of fluorocarbon polymers can be applied directly after drying in the air at about room temperature and in the absence of intermediate heat treatment, without these adhesion properties being sacrificed.

This object is achieved, in accordance with the present invention, by a primer coating composition which comprises (a) 100 parts by weight of a copolymer consisting of 0.5 to 11% by weight of copolymerized units of a perfluoro(alkylvinyl)ether of the formula $CF_2=CF—OR$, wherein R is a perfluoroalkyl radical having 1 to 10 carbon atoms, of 0 to 12% by weight of copolymerized units of hexafluoropropylene or vinylidene fluoride or a mixture of these two monomers, and of copolymerized units of tetrafluoroethylene and, if appropriate, of dispersed polytetrafluoroethylene particles having a mean particle size of 0.05 to 30 $\mu$m, the weight ratio of the stated copolymer to dispersed polytetrafluoroethylene being 100:0 to 20:80, (b) 10 to 250 parts by weight of the total amount comprising lithium hydroxide plus suspended, finely divided $SiO_2$ produced by thermal treatment, the molar ratio of LiOH to $SiO_2$ being 1:0.5 to 1:30, (c) 10 to 1000 parts by weight of at least one thermoplastic resin from the group comprising (c$_1$) polyarylene sulfide resins,
(c$_2$) aromatic polyether-sulfone resins and
(c$_3$) aromatic polyether-ketone resins, and (d) water as a liquid carrier.

The copolymer employed as component (a) consists of 0.5 to 11, preferably 0.8 to 6.0, % by weight of copolymerized units of a perfluoro(alkylvinyl)ether of the formula $CF_2=CF—OR$, wherein R is a perfluoroalkyl radical having 1 to 10 carbon atoms, preferably a straight-chain radical having 2 to 4, in particular 3, carbon atoms, and of 0 to 12, preferably 0 to 3, % by weight of copolymerized units of vinylidene fluoride or, preferably, hexafluoropropylene. The remainder consists of copolymerized units of tetrafluoroethylene, the percentages in each case being relative to the total weight of the copolymer. A particularly preferred component (a) is a copolymer consisting of 0.4 to 3.0% by weight of copolymerized units of hexafluoropropylene and 0.8 to 6.0% by weight of copolymerized units of perfluoro(propylvinyl)ether, the remainder likewise consisting of copolymerized units of tetrafluoroethylene. The preparation of such copolymers is known, and is described in, for example, U.S. Pat. Nos. 3,132,123, 3,235,537, 3,528,954, 3,642,742 and 3,635,926 and that of the preferred terpolymers is described in U.S. Pat. No. 4,029,868 and in German Offenlegungsschrift No. 2,639,109.

In the primer coating composition according to the invention, some of the 100 parts by weight of the copolymer defined above and constituting component (a) can, if appropriate, be replaced by polytetrafluoroethylene particles dispersed in the liquid carrier, and the amount replaced can be up to 80, preferably up to 50, parts by weight. Thus, the weight ratio of the copolymer of the type defined above to dispersed polytetrafluoroethylene within component (a) is 100:0 to 20:80, preferably 100:0 to 50:50. Moreover, these polytetrafluoroethylene particles can either be dispersed in the form of particles of colloidal size or be suspended in the form of particles of supercolloidal particle size. The mean particle size of these polytetrafluoroethylene particles should be 0.05 to 30 μm, but a range of 0.1 to 3 μm is preferred. Polytetrafluoroethylene should be understood as meaning not only the conventional high molecular weight polytetrafluoroethylene; instead, for the purposes of this invention, this term also includes the so-called polytetrafluoroethylene waxes which are formed by degradation of a high molecular weight polytetrafluoroethylene or by telomerization reactions of tetrafluoroethylene. They possess a melt viscosity of 1 to $10^7$, preferably of 10 to $10^5$, Pas (measured using a high-pressure capillary viscosimeter at 380° C., 21 kp/cm² extrusion pressure, die dimensions: 1 mm diameter and 10 mm length, as described in German Pat. No. 2,414,389).

However, preferred primer coating compositions are those which, as the fluorocarbon polymer component, exclusively contain the copolymers in component (a).

The primer coating composition according to the invention contains, as component (b), a mixture of lithium hydroxide and, suspended in the liquid carrier, finely divided, thermally produced silicon dioxide in an amount corresponding to 10 to 250 parts by weight, preferably 10 to 100 parts by weight, relative to the 100 parts by weight of component (a), of solid. The molar ratio of LiOH to $SiO_2$ in this mixture is 1:0.5 to 1:30, preferably 1:2 to 1:12. The finely divided silicon dioxide prepared by thermal treatment and used in this mixture is a commercial product. It is produced by known processes, either by combustion of certain silicon compounds, such as, for example, of $SiCl_4$ or silanes, in the presence of oxygen, or by sublimation of silicon compounds, such as, for example, of quartz, silica and other silicon-oxygen compounds, in an electric arc. This $SiO_2$ produced by thermal treatment is present virtually exclusively in the form of agglomerated particles which have a relatively broad particle size distribution which varies in the range from 0.01 to 50, preferably from 0.05 to 25, μm, the mean particle size being about 0.5 to 40, preferably 2 to 20, μm.

To prepare such silicon dioxide suspensions in a lithium hydroxide solution, the lithium hydroxide is dissolved in deionized water, and the finely divided, thermally treated $SiO_2$ is stirred in.

As a further component (c), the primer coating composition according to the invention contains at least one thermoplastic resin from the group comprising ($c_1$) polyarylene sulfide resins, ($c_2$) aromatic polyether-sulfone resins and ($c_3$) aromatic polyether-ketone resins, and the expression "at least one thermoplastic resin" includes both mixtures of different types within the particular family ($c_1$), ($c_2$) or ($c_3$) and mixtures which consist of at least two members from the families ($c_1$), ($c_2$) and ($c_3$). This resin is present in the primer in an amount of 10 to 1000 parts by weight, preferably 70 to 300 parts by weight, relative to the 100 parts by weight of (a).

The polyarylene sulfide resins used are polymers as described and defined in, in particular, U.S. Pat. No. 3,354,129 (also sometimes referred to as polyarylene thioethers in the literature). Polyarylene sulfide resins can be prepared by various processes which are described in the literature. Such preparation methods are described in, for example, U.S. Pat. Nos. 2,513,188, 3,354,129, 3,492,125 and 3,487,454, in German Auslegeschrift No. 2,160,754 and in British Pat. No. 962,941. The polyarylene sulfide resins can preferably be prepared (cf. in particular U.S. Pat. No. 3,354,129) by reacting unsaturated cyclic compounds polysubstituted by halogen, in particular polyhalogenated aromatic cyclic compounds, in a polar organic solvent, with alkali metal sulfides. The polymers formed possess the ring structure of the polyhalogenated cyclic compounds, which are coupled together through sulfur atoms. Preferred polyarylene sulfide resins are those containing repeating —R—S units in which R denotes a biphenylene, a naphthylene or a biphenylene ether radical or in particular a phenylene radical which is bonded in the o-, m- or, preferably, p-position, and all these radicals can be substituted by alkyl radicals having 1 to 6 carbon atoms, in particular by methyl groups. However, it is also possible to use polyarylene sulfide resins as obtainable in accordance with U.S. Pat. No. 2,513,188, by reaction of polyhalogenated aromatics with sulfur or other metal sulfides, as well as those obtained in accordance with British Pat. No. 962,941, by heating metal salts of halogenated thiophenols to the polymerization temperature.

The polyarylene sulfide resins employed in the primer coating composition according to the invention should preferably possess a melting point of 204°–482° C., in particular a melting point of 240°–420° C. The intrinsic viscosity of these polyarylene sulfide resins should be at least 0.1, preferably 0.1 to 0.3 and in particular 0.13 to 0.23, measured on a 0.25% strength by weight solution in chloronaphthalene at 206° C. Within the scope of this invention, polyphenylene sulfide resins are preferred, particularly the types which are substituted in the p-position.

Thermoplastic aromatic polyether-sulfones as used in the primer according to the invention are characterized by repeating units of the general formula

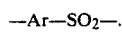

In this formula, Ar is a divalent aromatic radical, in particular

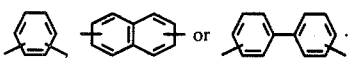

This aromatic radical can, if appropriate, vary from unit to unit in the polymer chain, but this chain contains at least some units in which Ar has the meaning

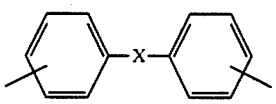

wherein X is oxygen. Similarly, X may also be the radical of an aromatic diol, as expressed by the formula

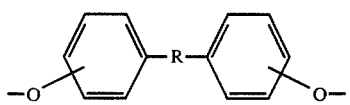

wherein R is an alkylene radical having 1 to 6 carbon atoms, preferably an alkylene radical of the formula —C(CH$_3$)$_2$—.

Examples of such units which are repeated in the polyether-sulfones, which may be present in varying combinations, are

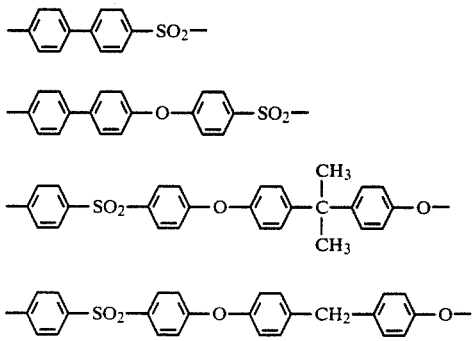

and preferably

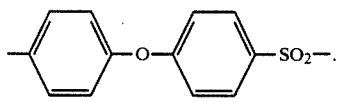

Thermoplastic aromatic polyether-sulfone resins and the processes for their preparation are known to those skilled in the art. Typical compounds of this class of highly thermally stable thermoplastic resins and processes for their preparation are disclosed in, for example, U.S. Pat. Nos. 3,264,536, 3,321,449, 3,355,272 and 3,634,355, in British Pat. Nos. 1,016,245, 1,060,546, 1,078,234, 1,109,842, 1,122,192, 1,133,561, 1,153,528, 1,163,332, 1,177,183, 1,234,301, 1,264,900, 1,265,144, 1,286,673, 1,296,383, 1,298,821 and 1,303,252, in Canadian Pat. No. 847,963, in German Offenlegungsschriften Nos. 1,938,806 and 2,433,400 and in Swiss Pat. No. 491,981.

It is also possible to use branched aromatic polyether-sulfones as described in German Offenlegungsschrift No. 2,305,413. It is particularly advantageous to use these in the form of aqueous dispersions or suspensions, as described in European Patent Application No. 32,630.

The polyether-sulfone resins employed in connection with the primer coating composition according to the invention should in general posses a reduced viscosity in the range from 0.03 to 0.6 (measured at 25° C. on a solution of 1 g of the polymer in 100 cm$^3$ of dimethylformamide).

Thermoplastic aromatic polyether-ketones as used in the primer coating composition according to the invention are characterized by repeating units of the general formula

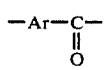

In this formula, Ar is a divalent aromatic radical, in particular

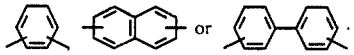

This aromatic radical can, if appropriate, vary from unit to unit in the polymer chain, at least some units containing ether groups, i.e. Ar has the meaning

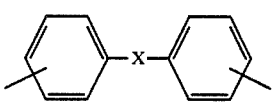

wherein X is oxygen. Similarly, X may also be the radical of an aromatic diol, as expressed by the formula

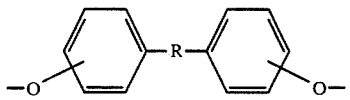

wherein R is an alkylene radical having 1 to 6 carbon atoms, preferably an alkylene radical of the formula —C(CH$_3$)$_2$—.

Examples of such units which are repeated in polyether-ketones, and which can be present in varying combinations, are

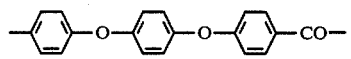

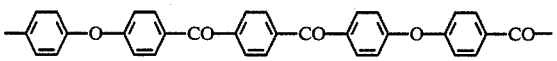

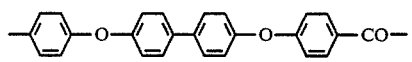

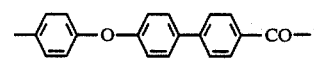

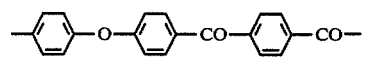

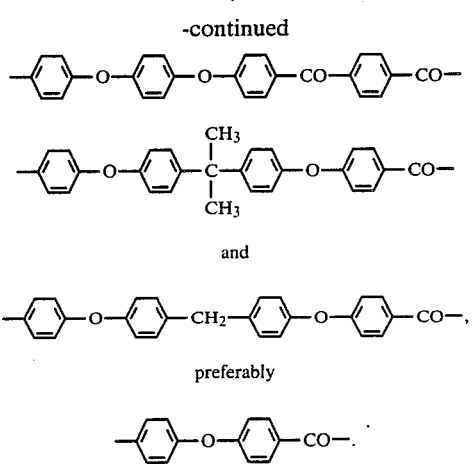

preferably $$-\langle\bigcirc\rangle-O-\langle\bigcirc\rangle-CO-.$$

Thermoplastic aromatic polyether-ketone resins are known to those skilled in the art. Typical compounds of this class of highly thermally stable thermoplastic resins and processes for their preparation are disclosed in, for example, U.S. Pat. Nos. 3,751,398, 3,914,298, 3,925,307, 3,953,400, 3,956,240, 3,965,146, 4,024,314 and 4,111,908, British Pat. Nos. 971,227, 1,019,226, 1,019,458, 1,078,234, 1,086,021, 1,102,679, 1,153,527, 1,164,817, 1,177,183, 1,383,393, 1,387,303, 1,414,421, 1,414,422, 1,414,423 and 1,567,190 and European Offenlegungsschrift No. 1,879.

The polyether-ketones used for the primer coating composition according to the invention should in general posses an intrinsic viscosity of 0.01 to 0.4. The intrinsic viscosity is measured on a solution of 1 g of polyether-ketone in 100 cm$^3$ of concentrated sulfuric acid at 25° C.

The primer coating composition according to the invention finally contains, as component (d), water as a liquid carrier. The amount of component (d) is not critical, but certain limits should be maintained in respect of the total solids (sum of the weights a+b+c). The ratio of total solids to water should advantageously be 10:90 to 60:40, preferably 20:80 to 40:60. For some applications, it is advantageous to replace an amount of 1 to 20% by weight of the water used as a liquid carrier by a water-miscible and moisture-retaining organic solvent, such as glycerol, a glycol or a glycol-ether, in order to reduce the rate at which the primer composition dries.

If appropriate, the conventional fillers and pigments, such as, for example, iron oxide, carbon black, mica and titanium dioxide, can also be added to the primer according to the invention, the amount being 1 to 40, preferably 5 to 25% by weight, relative to the total weight of components (a) plus (b) plus (c).

The copolymer present in component (a) is preferably employed in the form of a colloidal dispersion with a mean particle size of 0.05 to 3 μm. Colloidal dispersions with a solids content of 10 to 20% by weight of polymer solid, as obtainable directly from the emulsion-polymerization of the above-mentioned comonomers, can be used for this purpose. Advantageously, however, such dispersions are first concentrated to a polymer solids content of 20 to 60% by weight of means of known methods, for example by decanting or by an ultrafiltration process (as described in European Patent Application No. 15,481). However, the copolymers of component (a) can also be employed in the form of a powder obtained from colloidal dispersions by coagulation (for example by power stirring with the use of high shearing forces, or by the addition of electrolytes). Powders of this type are then suspended in water, and the dispersions thus obtained have mean particle sizes in the range from 3 to 30 μm. Finally, it is also possible to use suspension polymers, as obtainable from the above-mentioned comonomers by the method of suspension-polymerization, which polymers likewise have a mean particle size of 3 to 30 μm or can be milled to this particle size; these powders should likewise possess particle sizes in the range from 3 to 30 μm for use in the primer according to the invention.

Component (c) is preferably added in the form of an aqueous suspension. This suspension is prepared by milling the resin component in water using the conventional abrasion units, such as ball mills or stirred ball mills. The solids content of the suspension is usually 10 to 60% by weight, preferably 20 to 40% by weight. For stabilization, it is advantageous to add to the suspension, before milling, 0.5 to 15% by weight, preferably 1 to 10% by weight, of an anionic or non-ionic surface-active dispersant, such as, for example, sodium lauryl sulfate or oxyethylated octylphenols.

Preferably, the primer coating composition according to the invention is prepared as follows: aqueous suspensions or colloidal dispersions of the copolymer of component (a) are mixed together with the previously described aqueous suspension of component (b), consisting of a mixture of LiOH and thermally produced SiO$_2$, and the suspension containing component (c). The desired content of water as a liquid carrier is either predetermined as a result of suitable concentration of the components to be mixed, or is established by subsequent addition of water.

Where polytetrafluoroethylene dispersed in component (a) is present, the former is likewise advantageously added in the form of an aqueous suspension or colloidal dispersion. The sequence in which the components are mixed is not critical. However, if one or both of the constituents of component (a) are employed in the form of a powder, this powder can be milled together with component (c), in the form of a suspension, in an abrasion unit. If appropriate, component (b) can also be present during the milling process. If the constituents of component (a) are used in the form of a colloidal aqueous dispersion, this should be added only after the milling process. If the primer composition according to the invention contains pigments, these are advantageously milled together with component (c). However, they can also be mixed with (a) or (b) or mixtures of these.

The primer composition according to the invention is applied by known methods, such as, for example, by immersion, rolling on or spraying on. In one application, layer thicknesses of about 5 to 40 μm are achieved. Where the ground to be coated has a smooth surface, this is roughened beforehand, advantageously by sandblasting or etching.

After the application and after the primer coat has been dried for a short time in the air at room temperature or slightly above (15° to 40° C.), the topcoat, comprising fluorocarbon polymers, can be applied directly. If required, this drying can also be dispensed with, and the topcoat can be applied onto the still moist primer coat. The advantage of the primer composition according to the invention over the primer compositions disclosed in European Offenlegungsschrift No. 14,974, which contain only components (a) and (b) and a liquid carrier, is that the topcoats of fluorocarbon polymers exhibit outstanding adhesion properties even where the primer coat is more than 10 μm thick. The primer composition according to the invention is therefore very useful for coating articles which have a complicated shape and in which, because of their shape, it is not possible to apply a uniformly thin layer, and therefore the critical layer thickness, at which adequate adhesion can no longer be achieved with the known primers, is exceeded.

The topcoat used can be a polytetrafluoroethylene dispersion which, if required, is provided with known additives, such as pigments, anionic, cationic and/or non-ionic wetting agents, leveling agents and auxiliary film-formers. For example, sodium lauryl sulfate or octylphenol oxyethylated with 8 to 10 moles of ethylene oxide have been found to be suitable wetting agents; the leveling agents used are toluenes, and examples of auxiliary film-formers used include small amounts of silicone resins, as described in U.S. Pat. Nos. 2,462,242 and 2,470,593. Other highly thermally stable thermoplastic resins, such as polyether-sulfones, polyarylene sulfides, polyamideimides and polyimides are also suitable auxiliary film-formers.

Other suitable topcoats include dispersions of copolymers prepared from perfluoro(alkylvinyl) ethers and tetrafluoroethylene and if appropriate also a third monomer, such as hexafluoropropylene or vinylidene fluoride, in particular having the same composition as the copolymers of component (a). However, other copolymers of tetrafluoroethylene with fluorinated, in particular perfluorinated, monomers, such as, for example, the long-known copolymers of tetrafluoroethylene with hexafluoropropylene, are also suitable. Mixtures of colloidal polytetrafluoroethylene dispersions and such copolymer dispersions can also be used as the topcoat. Like the polytetrafluoroethylene dispersions, compositions of this type can be modified with pigments, wetting agents, leveling agents and film-formers.

After the application of the topcoat, the entire coating is dried at 80° to 300° C. and then baked at 290° to 460° C., preferably at 320° to 400° C. The drying time and baking time are each advantageously 5 to 30 minutes.

The primer coating composition according to the invention is preferably used for producing primer coatings for firmly bonded non-stick coatings for cooking, baking, roasting and grilling utensils, as well as for sliding elements and metering devices, and the articles to be coated can have a shape such that it is not possible to apply a uniform layer of the primer.

The examples which follow illustrate the invention in more detail:

EXAMPLE 1

Mixture A

A suspension of
500 g of polyphenylene sulfide (melting point 280° C.),
50 g of pigment carbon black,
25 g of a non-ionic wetting agent (octylphenol, oxyethylated with, on average, 9 ethylene oxide units) and
2000 g of water
is prepared by stirring. The mixture is milled in a ball mill for 18 hours.

Mixture B 11.2 g of lithium hydroxide are dissolved in 182 g of deionized water. 28 g of silicon dioxide prepared by thermal treatment are stirred into this solution and dispersed for 1 hour with a propeller stirrer. This suspension is left to stand for 24 hours. Thereafter, 280 g of a dispersion of a terpolymer consisting of 1.5% by weight of copolymerized hexafluoropropylene units, 3.5% by weight of copolymerized perfluoro(propylvinyl) ether units and 95% by weight of copolymerized tetrafluoroethylene units and having a melting point of 307° C. and a melt index of 30 g/10 min (372° C.; 5 kg. load) are stirred in. This dispersion had beforehand been concentrated to a solids content of 50% by weight by decantation. By reducing 239.5 g of mixture A with 200 g of mixture B, a primer dispersion is prepared. The primer dispersion is applied, in a layer thickness of up to 20 μm, on aluminum sheets by means of a spraygun. The surface of the aluminum plates have been roughened beforehand by sand-blasting with corundum (100 to 120 μm particle size) to a depth of 5 to 10 μm.

The coated aluminum sheets are left to stand for 10 minutes at room temperature, after which a topcoat dispersion is applied using a spraygun. This dispersion has the following composition: 100 parts by weight of a 60% strength by weight polytetrafluoroethylene dispersion, 1 part by weight of sodium lauryl sulfate, 6.1 parts by weight of a non-ionic wetting agent (octylphenol oxyethylated with, on average, 9 ethylene oxide units), 3 parts by weight of glycol, 1 part by weight of pigment carbon black, 17.1 parts by weight of titanium dioxide, 10 parts by weight of a solution of 50% by weight of silicone resin in ethyl acetate and xylene (2:1), 5 parts by weight of xylene and 5 parts by weight of tetralin. Both layers are dried for 10 minutes at 90° C. and for 10 minutes at 250° C., and are baked for 10 minutes at 420° C.

The adhesion on the resulting coating is tested in accordance with DIN 53 151 (cross-cut test). An adhesion of 0 is obtained in this test.

EXAMPLE 2

0.746 g of lithium hydroxide is dissolved in 82 g of deionized water. 7.5 g of silicon dioxide prepared by thermal treatment are stirred into this solution and dispersed for 1 hour with a propeller stirrer. The suspension is left to stand for 24 hours. Thereafter, 159 g of a dispersion of a terpolymer are stirred in. The terpolymer consists of 94.1% by weight of copolymerized tetrafluoroethylene units, 1.5% by weight of copolymerized hexafluoropropylene units and 4.4% by weight of copolymerized perfluoro(propyl-vinyl) ether units and has a melting point of 304° C. The melt index is 24.5 g/10 min for a load of 5 kg and at 372° C. The dispersion had beforehand been concentrated to a solids content of 50% by weight by decantation.

361 g of mixture A from Example 1 are added to 200 g of this mixture, while stirring. The resulting mixture is, as described in Example 1, applied onto sand-blasted aluminum sheets and left to stand for 10 minutes at room temperature. Thereafter, a topcoat dispersion having the following composition is applied by means of a spraygun: 100 parts by weight of a 60% strength by weight polytetrafluoroethylene dispersion, 1 part by weight of sodium lauryl sulfate, 6.1 parts by weight of a non-ionic wetting agent (octylphenol, oxyethylated with, on average, 9 ethylene oxide units), 3 parts by weight of glycol, 1 part by weight of pigment carbon black, 17.1 parts by weight of titanium dioxide, 15 parts by weight of a 40% strength by weight aqueous suspension of polyphenylene sulfide and 5 parts by weight of xylene. Both layers are dried for 10 minutes at 90° C. and for 10 minutes at 250° C., and are baked for 10 minutes at 420° C.

The adhesion on the resulting coating is tested in accordance with DIN 53 151 (cross-cut test). An adhesion of 0 is obtained in this test.

EXAMPLE 3

3.1 g of lithium hydroxide are dissolved in 106 g of deionized water. 30.9 g of silicon dioxide prepared by thermal treatment are stirred into this solution. The resulting suspension is left to stand for 24 hours. Thereafter, 110 g of a dispersion which contains 50% by weight of a terpolymer composed of 88.5% by weight of copolymerized tetrafluoroethylene units, 9% by weight of copolymerized vinylidene fluoride units and 2.5% by weight of copolymerized perfluoro(propylvinyl) ether units and having a melt index (372° C., 5 kg) of 9.7 g/min and a melting point of 310° are added, while stirring. 542 g of mixture A from Example 1 are added to 200 g of this mixture, while stirring. The primer dispersion thus prepared is applied onto sand-blasted aluminum sheets, as described in Example 1. After drying in the air for 10 minutes, a polytetrafluoroethylene dispersion containing 60% by weight of solids is applied. Thereafter, both layers are dried for 10 minutes at 90° C. and then for 10 minutes at 250° C., and are baked for 10 minutes at 400° C.

In the cross-cut test according to DIN 53 151, the adhesion of the coating thus produced is 0.

EXAMPLE 4

4.7 g of lithium hydroxide are dissolved in 198 g of deionized water. 47 g of SiO$_2$ prepared by thermal treatment are stirred into this solution, as described in Example 1. The suspension is left to stand for 24 hours. Thereafter, 100 g of a dispersion containing 50% by weight of a terpolymer and then 50 g of a dispersion containing 50% by weight of high molecular weight polytetrafluoroethylene are added. The terpolymer consists of 94.1% by weight of copolymerized tetrafluoroethylene units, 1.5% by weight of copolymerized hexafluoropropylene units and 4.4% by weight of copolymerized perfluoro(propylvinyl) ether units and has a melting point of 304° C. The melt index is 24.5 g/10 min for a load of 5 kg and at 372° C. 542 g of mixture A described in Example 1 are added to 200 g of this mixture, while stirring. The primer dispersion thus obtained is applied, as described in Example 1, onto sand-blasted aluminum plates, and is coated, in accordance with Example 2, with the topcoat dispersion described in that example; thereafter, the primer coat and the topcoat are dried and baked as described in Example 2.

The adhesion in the cross-cut test according to DIN 53 151 is 0 to 1.

EXAMPLE 5

Example 4 is repeated except that, in the primer coat, the dispersion of polytetrafluoroethylene with the conventional high molecular weight is replaced by 50 g of a dispersion containing 50% by weight of polytetrafluoroethylene wax which has a melt viscosity of 10$^3$ Pa s and is prepared by emulsion-polymerization of tetrafluoroethylene in the presence of chloroform.

In the cross-cut test, the resulting coating has an adhesion of 0.

EXAMPLE 6

11.2 g of lithium hydroxide are dissolved in 475.2 g of deionized water, and thereafter 111.8 g of silicon dioxide prepared by thermal treatment are stirred in. This suspension is left to stand for 24 hours. Thereafter, 277.2 g of a 50% strength by weight aqueous suspension of a copolymer are added. The copolymer consists of 3.3% by weight of copolymerized perfluoro(propylvinyl) ether units and 96.7% by weight of copolymerized tetrafluoroethylene units and has a melt index of 12.5 g/10 min for a load of 5 kg and at 372° C. 200 g of mixture A from Example 1 are added to 200 g of the suspension thus prepared, and this primer is then applied, as described in Example 1, onto sand-blasted aluminum sheets, and is provided with the topcoat according to Example 1. The coating is dried for 10 minutes at 90° C. and for 10 minutes at 250° C. and baked for 10 minutes at 420° C., after which it exhibits an adhesion of 0 in the cross-cut test according to DIN 53 151.

EXAMPLE 7

28.2 g of a pulverulent terpolymer are added to 500 g of a 9% strength polyether-sulfone suspension, while stirring. The mixture is milled in a stirred ball mill. The polyether-sulfone suspension is prepared as follows: 600 g of a polyether-sulfone which essentially contains repeating units of the formula

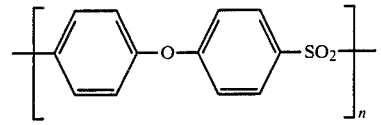

and possesses a reduced viscosity of 0.5 are dissolved in 3000 g of methylene chloride, while stirring. 30 minutes after the polyether-sulfone has dissolved completely, a solution consisting of 30 g of a non-ionic wetting agent (octylphenol, containing, on average, 4.5 ethylene oxide units) and 2970 g of methylene chloride is added, while stirring. The mixture is milled in a stirred ball mill. Thereafter, 3 kg of methanol are added, while stirring. The suspension thus obtained is filtered off and washed with methanol until the filter cake no longer smells of methylene chloride. Thereafter, the filter cake is taken up in 5 kg of water, the mixture is filtered once again and the residue is washed methanol-free with water. The filter cake treated in this manner is once again taken up in 5 kg of water, and 50 g of a non-ionic wetting agent (octylphenol containing, on average, 9 ethylene oxide units) are added. This mixture is then homogenized using a high-speed stirrer of the Ultra-Turrax ® type.

The admixed terpolymer consists of 1.5% by weight of copolymerized hexafluoropropylene units, 3.2% by weight of copolymerized perfluoro(propylvinyl) ether units and 95.3% by weight of copolymerized tetrafluoroethylene units and has a melting point of 310° C. and a melt index of 15 g/10 min at 372° C. and 5 kg load. 1.6 g of lithium hydroxide are dissolved in 100 g of water, and 15.8 g of silicon dioxide prepared by thermal treatment are added, while stirring. The mixture is left to stand for 24 hours, after which it is combined with the mixture described above.

The primer dispersion is applied, in a layer thickness of up to 20 μm, onto aluminum sheets by means of a spraygun. The surfaces of the aluminum plates have been roughened beforehand by sand-blasting with corundum (100 to 120 μm particle size) to a depth of 5 to 10 μm. The coated aluminum sheets are left to stand for 10 minutes at room temperature, and a topcoat dispersion is then applied by means of a spraygun. This dispersion has the following composition: 100 parts by weight of a 60% strength by weight polytetrafluoroethylene dispersion, 1 part by weight of sodium lauryl sulfate, 6.1 parts by weight of a non-ionic wetting agent (octylphenol oxyethylated with, on average, 9 ethylene oxide units), 3 parts by weight of glycol, 1 part by weight of pigment carbon black, 17.1 parts by weight of titanium dioxide and 15 parts by weight of a 40% strength by weight aqueous polyether-sulfone suspension. Both layers are dried for 10 minutes at 90° C. and for 10 minutes at 250° C. and are baked for 10 minutes at 420° C.

In the cross-cut test according to DIN 53 151, the resulting coating has an adhesion of 0.

EXAMPLE 8

Mixture C 15 g of a non-ionic wetting agent (octylphenol oxethylated with, on average, 9 ethylene oxide units) ar dissolved in 1000 g of deionized water. 250 g of a polyethersulfone resin and 25 g of pigment carbon black are added to this solution, while stirring. The mixture is milled in a ball mill for 18 hours.

The polyether-sulfone used contains repeating units of the formula

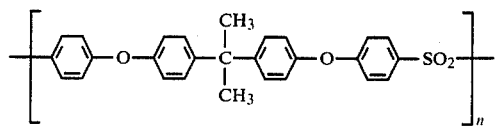

and has a reduced viscosity of 0.08. By mixing 239.5 g of mixture C with 200 g of mixture B from Example 1, a primer dispersion is prepared, as described in Example 1. The primer dispersion is applied, in a layer thickness of up to 20 μm, onto aluminum sheets by means of a spraygun. The surfaces of the aluminum sheets have been roughened beforehand by sand-blasting with corundum (100 to 120 μm particle size) to a depth of 5 to 10 μm. After standing at room temperature for 10 minutes, a polytetrafluoroethylene dispersion containing 60% by weight of solids and described in Example 1 is applied. Both layers are then dried for 10 minutes at 90° C. and for 10 minutes at 250° C. and are baked for 10 minutes at 400° C.

In the cross-cut test according to DIN 53 151, the adhesion of the coating thus produced is 0.

EXAMPLE 9

7 g of a non-ionic wetting agent (octylphenol oxyethylated with, on average, 9 ethylene oxide units) are dissolved in 545 g of a 9% strength polyether-sulfone suspension which is prepared as described in Example 7. 80 g of polyphenylene sulfide (melting point 280° C.) and 12 g of pigment carbon black are added to this suspension, while stirring.

The mixture is milled in a ball mill for 18 hours.

By mixing 239.5 g of this mixture with 200 g of mixture B from Example 1, a primer dispersion is prepared as described in Example 1; this dispersion is applied onto sand-blasted aluminum sheets, and provided with the topcoat described in Example 1. The coating is dried for 10 minutes at 90° C. and for 10 minutes at 250° C. and baked for 10 minutes at 420° C., after which its adhesion in the cross-cut test according to DIN 53 151 is 0.

EXAMPLE 10

100 g of a polyether-ketone (essentially consisting of repeating units of the formula

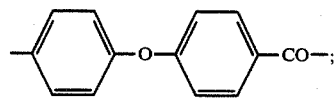

inherent viscosity 0.14, measured on 1 g of the polyether-ketone in 100 cm$^3$ of concentrated H$_2$SO$_4$ at 25° C.) are dissolved in 10 kg of concentrated sulfuric acid. The solution is added dropwise to 50 liters of water while stirring. The precipitate of finely divided polyetherketone which forms during this procedure is filtered off and washed neutral with water, the filter cake is digested and water is added until the total weight of the polyetherketone and the water is 1 kg. Thereafter, 5 g of a non-ionic wetting agent (octylphenol oxyethylated with, on average, 9 ethylene oxide units) are added, while stirring. The mixture is then milled in a ball mill for 24 hours.

10 g of a 50% strength by weight terpolymer dispersion are mixed with 50 g of a 10% strength by weight suspension obtained in this manner. This terpolymer consists of 1.5% by weight of copolymerized hexafluoropropylene units, 3.5% by weight of copolymerized perfluoro(propylvinyl) ether units and 95% by weight of copolymerized tetrafluoroethylene units and has a melting point of 307° C. and a melt index of 30 g/10 min (372° C.; 5 kg load). A second mixture, obtained by dissolving 0.3 g of lithium hydroxide and 3 g of thermally produced silicon dioxide in 13.2 g of water, is added to this mixture while stirring.

The primer dispersion is applied, in a layer thickness of up to 20 μm, onto aluminum sheets by means of a spraygun. The surfaces of the aluminum sheets have been roughened beforehand by sand-blasting with corundum (100 to 120 μm particle size) to a depth of 5 to 10 μm. The coated aluminum sheets are left to stand for 10 minutes at room temperature, after which a topcoat dispersion is applied by means of a spraygun. This dispersion has the following composition: 100 parts by weight of a 60% strength by weight polytetrafluoroethylene dispersion, 1 part by weight of sodium lauryl sulfate, 6.1 parts by weight of a non-ionic wetting agent (octylphenol oxyethylated with, on average, 9 ethylene oxide units), 3 parts by weight of glycol, 1 part by weight of pigment carbon black, 17.1 parts by weight of titanium dioxide, 10 parts by weight of a solution of 50% by weight of silicone resin in ethyl acetate and xylene (2:1), 5 parts by weight of xylene and 5 parts by weight of tetralin. Both layers are dried for 10 minutes at 90° C. and for 10 minutes at 250° C. and are baked for 10 minutes at 420° C.

The adhesion on the resulting coating is tested in accordance with DIN 53 151 (cross-cut test). This test gives an adhesion of 0.

I claim:

1. A primer coating composition which comprises the following components, all amounts being based on the solids of said components:

(a) a component comprising 20–100% by weight of a copolymer containing 0.5 to 11% by weight, based on the weight of the copolymer, of copolymerized units of a perfluoro(alkylvinyl) ether of the formula $CF_2=CF-OR$, wherein R is a perfluoroalkyl radical having 1 to 10 carbon atoms, 0 to 12% by weight, based on the weight of the copolymer, of copolymerized units of hexafluoropropylene or vinylidene fluoride or mixtures of these two monomers, essentially the remainder, to 100% of the weight of the copolymer, consisting essentially of copolymerized units of tetrafluoroethylene;

0 to 80% by weight of said component (a) comprising dispersed polytetrafluoroethylene particles having a mean particle size of 0.05 to 30 μm;

(b) 10 to 250 parts by weight, per 100 parts by weight of said component (a), of a mixture comprising lithium hydroxide and finely divided $SiO_2$ which has been produced by thermal treatment, the LiOH:$SiO_2$ molar ratio ranging from about 1:0.5 to about 1:30;

(c) 10 to 1000 parts by weight, per 100 parts by weight of said component (a), of a thermoplastic resin selected from the group consisting of:

(c$_1$) a polyarylene sulfide resin, (c$_2$) an aromatic polyether-sulfone resin, (c$_3$) an aromatic polyether ketone resin, and mixtures thereof; and (d) water as a liquid carrier.

2. A primer coating composition as claimed in claim 1 wherein 10 to 100 parts by weight of component (b) are employed per 100 parts by weight of component (a).

3. A primer coating composition as claimed in claim 1 wherein 70 to 300 parts by weight of component (c) are employed per 100 parts by weight of component (a).

4. A primer coating composition as claimed in claim 1 wherein said dispersed polytetrafluoroethylene of component (a) is a polytetrafluoroethylene wax having a melt viscosity of 1 to $10^7$ Pa s.

5. A primer coating composition as claimed in claim 1 wherein the dispersed polytetrafluoroethylene of component (a) is present in (a) in an amount of up to 50% by weight.

6. A primer coating composition as claimed in claim 1 wherein the polyarylene sulfide resin of component (c) is a polyphenylene sulfide resin.

7. A primer coating composition as claimed in claim 1 wherein the aromatic polyether-sulfone resin essentially consists of repeating units of the formula

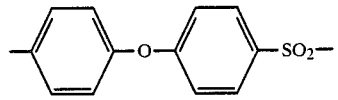

8. A primer coating composition as claimed in claim 1 wherein the aromatic polyether-ketone resin of component (c) essentially consists of repeating units of the formula

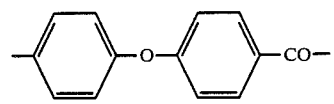

9. A primer coating composition as claimed in claim 1 wherein the copolymer of component (a) contains 0.8 to 6.0% by weight of copolymerized units of a perfluoro(alkylvinyl) ether containing a perfluoroalkyl radical which has 2 to 4 carbon atoms, and the remainder, to 100% by weight of the copolymer, consisting essentially of copolymerized units of tetrafluoroethylene.

10. A primer coating composition as claimed in claim 1 wherein the copolymer of component (a) contans 0.4 to 3.0% by weight of copolymerized units of perfluoro(propylvinyl) ether and 0.8 to 6.0% by weight of copolymerized units of hexafluoropropylene, and the remainder, to 100% by weight of the copolymer, consisting essentially of copolymerized units of tetrafluoroethylene.

11. A primer coating composition as claimed in claim 1, wherein said thermoplastic resin of said component (c) is an aromatic polyether ketone resin.

12. A primer coating composition as claimed in claim 11, wherein said aromatic polyether ketone consists essentially of repeating units of the formula

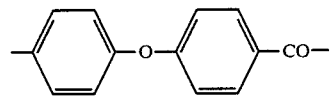

* * * * *